(12) United States Patent
Liang et al.

(10) Patent No.: US 11,101,493 B2
(45) Date of Patent: Aug. 24, 2021

(54) SECONDARY BATTERY AND ELECTRODE MEMBER THEREOF

(71) Applicant: CONTEMPORARY AMPEREX TECHNOLOGY CO., LIMITED, Ningde (CN)

(72) Inventors: Chengdu Liang, Ningde (CN); Zige Zhang, Ningde (CN); Qingrui Xue, Ningde (CN); Wei Li, Ningde (CN); Jing Li, Ningde (CN); Pengxiang Wang, Ningde (CN)

(73) Assignee: CONTEMPORARY AMPEREX TECHNOLOGY CO., LIMITED, Fujian Province (CN)

( * ) Notice: Subject to any disclaimer, the term of this patent is extended or adjusted under 35 U.S.C. 154(b) by 338 days.

(21) Appl. No.: 16/268,364

(22) Filed: Feb. 5, 2019

(65) Prior Publication Data
US 2020/0119389 A1    Apr. 16, 2020

(30) Foreign Application Priority Data
Oct. 11, 2018 (CN) .......................... 201811183466.4

(51) Int. Cl.
*H01M 10/04* (2006.01)
*H01M 2/02* (2006.01)
*H01M 50/116* (2021.01)

(52) U.S. Cl.
CPC ..... *H01M 10/0459* (2013.01); *H01M 10/049* (2013.01); *H01M 50/116* (2021.01)

(58) Field of Classification Search
None
See application file for complete search history.

(56) References Cited

U.S. PATENT DOCUMENTS

| 2013/0011742 A1* | 1/2013 | Park | H01M 4/661 429/234 |
| 2015/0004496 A1 | 1/2015 | Uematsu et al. | |
| 2016/0248117 A1* | 8/2016 | Liang | C23C 14/3414 |

FOREIGN PATENT DOCUMENTS

| CN | 205303580 U | 6/2016 |
| CN | 108155387 A | 6/2018 |

(Continued)

OTHER PUBLICATIONS

Thakur. "Nonconjugated Conductive Polymers". Journal of Macromolecular Science, Part A. Pure and Applied Chemistry. Volume 38, 2001—Issue 12. pp. 1-4. (Year: 2001).*

(Continued)

*Primary Examiner* — Christopher P Domone
(74) *Attorney, Agent, or Firm* — Morgan, Lewis & Bockius LLP

(57) ABSTRACT

The present disclosure provides a secondary battery and an electrode plate thereof. The electrode member comprises an insulating substrate, a first conducting layer and an active material layer; the first conducting layer is provided on a surface of the insulating substrate, the active material layer is provided at a side of the first conducting layer away from the insulating substrate; the first conducting layer is provided with a stripe-shape groove extending in a height direction, the stripe-shape groove is used for releasing stress of the first conducting layer. The secondary battery comprises an electrode assembly, the electrode assembly comprises the electrode member.

16 Claims, 13 Drawing Sheets

(56) References Cited

FOREIGN PATENT DOCUMENTS

| | | |
|---|---|---|
| CN | 207542313 U | 6/2018 |
| CN | 108417841 A | 8/2018 |
| CN | 108598491 A | 9/2018 |
| CN | 207818780 U | 9/2018 |
| CN | 208955108 U | 6/2019 |

OTHER PUBLICATIONS

Contemporary Amperex Technology Co., International Search Report and Written Opinion, PCT/CN2019/109961, dated Dec. 30, 2019, 10 pgs.—No Translation Available.

Contemporary Amperex Technology Co., Limited Extended European Search Report, EP19153878.4, dated May 22, 2019, 7 pgs.

* cited by examiner

SECONDARY BATTERY AND ELECTRODE MEMBER THEREOF

CROSS-REFERENCE TO RELATED APPLICATIONS

The present application claims priority to Chinese patent application No. CN201811183466.4, filed on Oct. 11, 2018, which is incorporated herein by reference in its entirety.

FIELD OF THE PRESENT DISCLOSURE

The present disclosure relates to the field of battery, and particularly relates to a secondary battery and an electrode member thereof.

BACKGROUND OF THE PRESENT DISCLOSURE

An electrode member of a secondary battery generally comprises a current collector and an active material layer coated on a surface of the current collector. In order to improve the safety performance of the secondary battery, some electrode plates 1 choose a current collector in multi-layer structure; referring to FIG. 1 to FIG. 3, the current collector comprises an insulating substrate 11 and a conducting layer 12 connected with a surface of the insulating substrate 11, the active material layer 13 is coated on a surface of the conducting layer 12.

In the production process of the electrode member, the active material layer 13 needs to be rolled and in turn become thin, thereby improving energy density. The insulating substrate 11 is made from a softer material such as PET (polyethylene terephthalate), the conducting layer 12 is generally made of a metal, an elastic modulus of the insulating substrate 11 is less than an elastic modulus of the conducting layer 1, so an extensibility of the insulating substrate 11 is greater than an extensibility of the conducting layer 12. In the extending process of the insulating substrate 11, the insulating substrate 11 will apply a force to the conducting layer 12; a connecting force between the insulating substrate 11 and the conducting layer 12 is small, so when the conducting layer 12 extends to a certain extent, the conducting layer 12 may fall off from the surface of the insulating substrate 11, thereby affecting performance of the electrode member.

SUMMARY OF THE PRESENT DISCLOSURE

In view of the problem existing in the background, an object of the present disclosure is to provide secondary battery and an electrode member thereof, which can reduce stress concentration, decrease the risk that the conducting layer falls off, and ensure performance of the electrode member.

In order to achieve the above object, the present disclosure provides a secondary battery and an electrode member thereof.

The electrode member comprises an insulating substrate, a first conducting layer and an active material layer; the first conducting layer is provided on a surface of the insulating substrate, the active material layer is provided at a side of the first conducting layer away from the insulating substrate; the first conducting layer is provided with a stripe-shape groove extending in a height direction of the electrode member.

The electrode member further comprises a second conducting layer, the second conducting layer has a first portion provided in the stripe-shape groove.

The second conducting layer further comprises a second portion, the second portion is provided on a surface of the first conducting layer away from the insulating substrate and connected with the first portion, the active material layer is provided on a surface of the second portion away from the first conducting layer.

The first conducting layer comprises a main portion and a protruding portion extending from the main portion, the main portion is coated with the active material layer, the protruding portion is not coated with the active material layer. The stripe-shape groove comprises a first groove provided in the protruding portion, and at least a part of the second portion is provided on a surface of the protruding portion away from the insulating substrate.

The stripe-shape groove further comprises a second groove provided in the main portion, the first groove is communicated with the second groove.

The electrode member further comprises a protecting layer, the protecting layer is provided on a region of the second portion corresponding to the protruding portion and connected with the active material layer.

A stiffness of the second conducting layer is less than a stiffness of the first conducting layer.

The stripe-shape groove passes through the first conducting layer in a thickness direction of the electrode member, and the first portion of the second conducting layer is connected with the insulating substrate.

The stripe-shape groove is provided as multiple in number, and the stripe-shape grooves are arranged to space apart from each other in a width direction of the electrode member.

The secondary battery comprises an electrode assembly, the electrode assembly comprises the electrode member.

The present disclosure has the following beneficial effects: in the present disclosure, the first conducting layer is provided with the stripe-shape groove, and the stripe-shape groove can effectively release the stress in the first conducting layer, reduce stress concentration, effectively decrease the risk that the first conducting layer falls off from the surface of the insulating substrate, and ensure performance of the electrode member.

Figure 1:
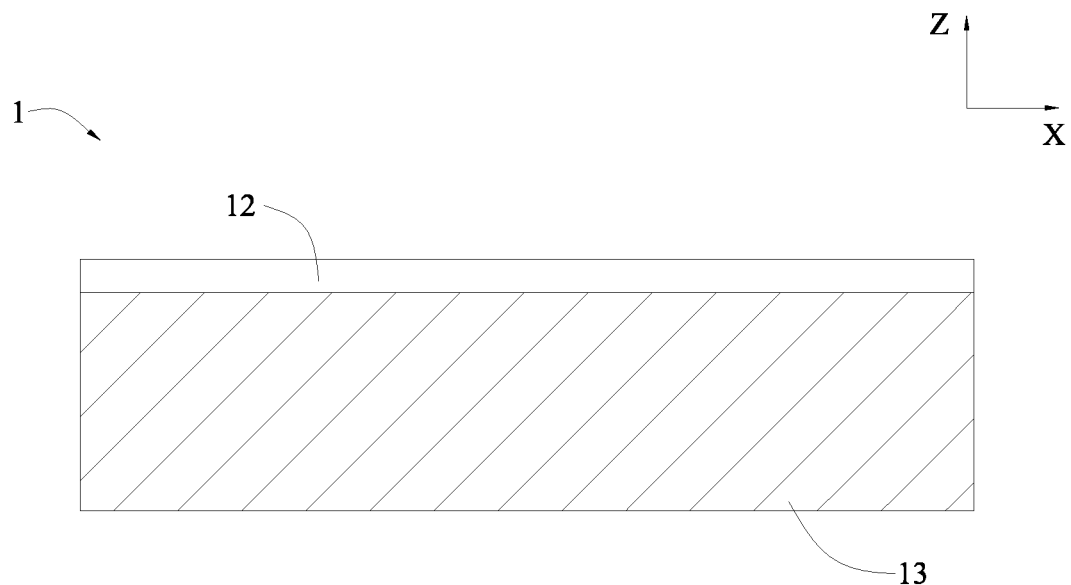
FIG. 1 is a schematic view of an electrode member in the prior art.
Figure 2:
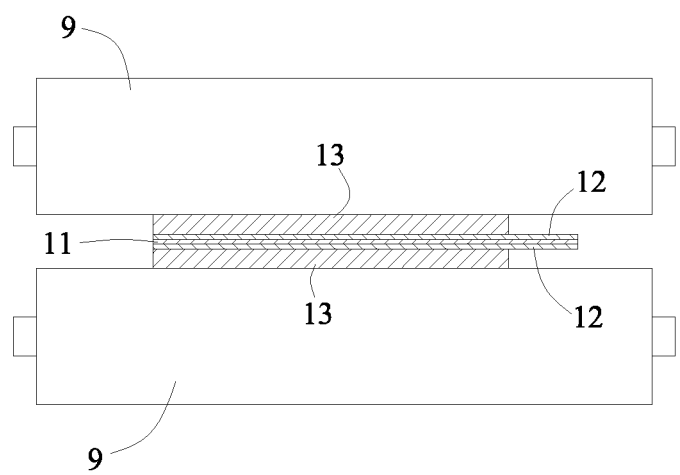
FIG. 2 is a schematic view of the electrode member of FIG. 1 in the process of rolling.
Figure 3:
FIG. 3 is a schematic view of an insulating substrate and a conducting layer of the electrode member of FIG. 1 before rolling.
Figure 4:
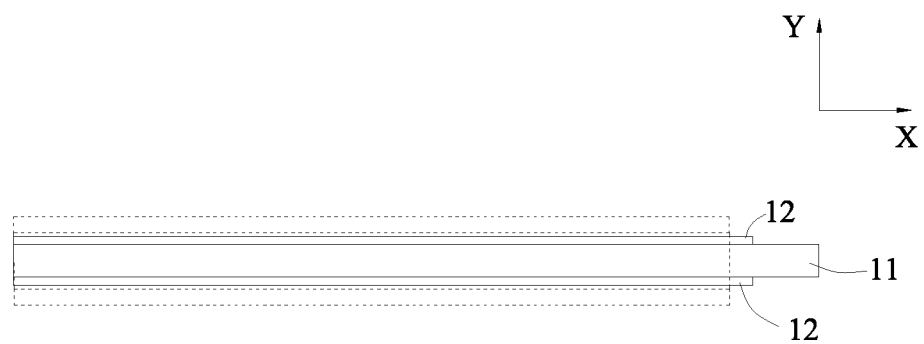
FIG. 4 is a schematic view of the insulating substrate and the conducting layer of the electrode member of FIG. 1 after rolling.

REFERENCE NUMERALS IN FIGURES ARE REPRESENTED AS FOLLOWS 1 electrode member
11 insulating substrate
12 first conducting layer
121 main portion
122 protruding portion
13 active material layer
14 second conducting layer
141 first portion
142 second portion
15 protecting layer
16 conductive structure
2 positive electrode member
3 negative electrode member
4 separator
5 case
6 cap plate
7 electrode terminal
8 connecting piece
9 roller
G stripe-shape groove
G1 first groove
G2 second groove
G3 third groove
G4 fourth groove
P electric guiding portion
X width direction
Y thickness direction
Z height direction

DETAILED DESCRIPTION

Hereinafter technical solutions of the embodiments of the present disclosure will be clearly and completely described in combination with the accompanying drawings in the embodiments of the present disclosure. Apparently, the described embodiments are a part rather than all of the embodiments of the present disclosure. The following description of at least one of the embodiments just is illustrative, and does not limit the present disclosure and the application or use thereof. All other embodiments obtained by the person skilled in the art based on the embodiments of the present disclosure without creative efforts shall fall within the protection scope of the present disclosure.

In the description of the disclosure, it is necessary to understand that the words such as "first", "second" and the like are only used for defining the components, and distinguishing the components correspondingly, if there is no description, the words do not have any special meaning, so that it cannot be understood as limiting the protection scope of the present disclosure.

Figure 6:
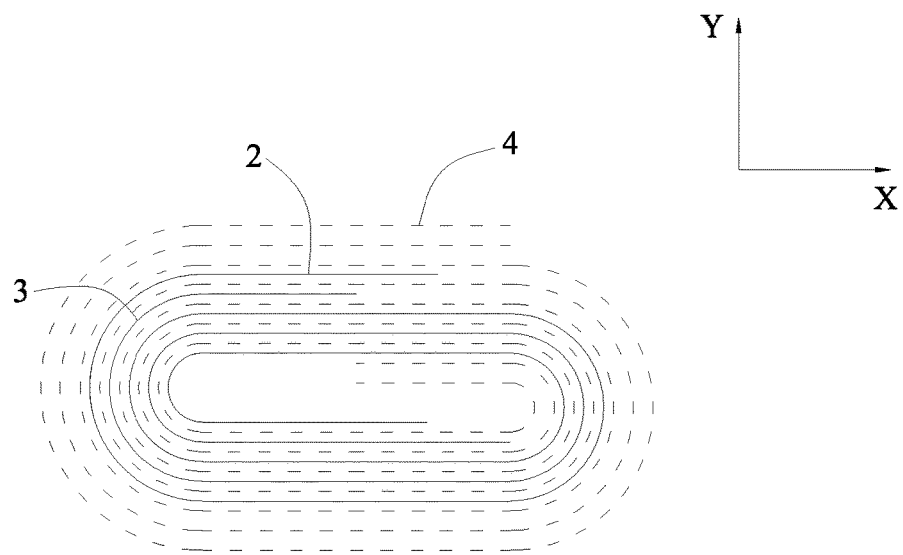
FIG. 6 is a cross sectional view of an electrode assembly according to the present disclosure.

A secondary battery of the present disclosure comprises an electrode assembly, referring to FIG. 6, the electrode assembly comprises a positive electrode member 2, a negative electrode member 3 and a separator 4, the separator 4 is provided between the positive electrode member 2 and the negative electrode member 3. The positive electrode member 2, the separator 4 and the negative electrode member 3 are stacked and wound to be a flat shape. The electrode assembly is a core component of the secondary battery to achieve a function of charge and discharge.

The secondary battery of the present disclosure can be a pouch-type battery; the electrode assembly formed by winding the positive electrode member 2, the separator 4 and the negative electrode member 3 is directly packaged in a pouch. The pouch can be made of an aluminum plastic film.

Certainly, the secondary battery of the present disclosure also can be a can-type battery. Specifically, referring to FIG. 5, the secondary battery mainly comprises the electrode assembly, a case 5, a cap plate 6, an electrode terminal 7 and a connecting piece 8.

The case 5 can have a hexahedron shape or other shape. A receiving cavity is formed inside the case 5 and receives the electrode assembly and an electrolyte. An opening is formed at an end of the case 5, and the electrode assembly can be placed into the receiving cavity of the case 5 via the opening. The case 5 can be made of a conductive metal such as aluminium, aluminium alloy and the like, and also can be made of an insulating material such as plastic.

The cap plate 6 is provided to the case 5 and covers the opening of the case 5, thereby sealing the electrode assembly in the case 5. The electrode terminal 7 is provided to the cap plate 6, an upper end of the electrode terminal 7 protrudes above the cap plate 6, and a lower end of the electrode terminal 7 can pass through the cap plate 6 and extend into the case 5. The connecting piece 8 is provided in the case 5 and fixed with the electrode terminal 7. The electrode terminal 7 and the connecting piece 8 each are provided as two in number, the positive electrode member 2 is electrically connected with one electrode terminal 7 via one connecting piece 8, and the negative electrode member 3 is electrically connected with the other electrode terminal 7 via the other connecting piece 8.

In the secondary battery, at least one of the positive electrode member 2 and the negative electrode member 3 employs a later mentioned electrode member 1.

Figure 7:
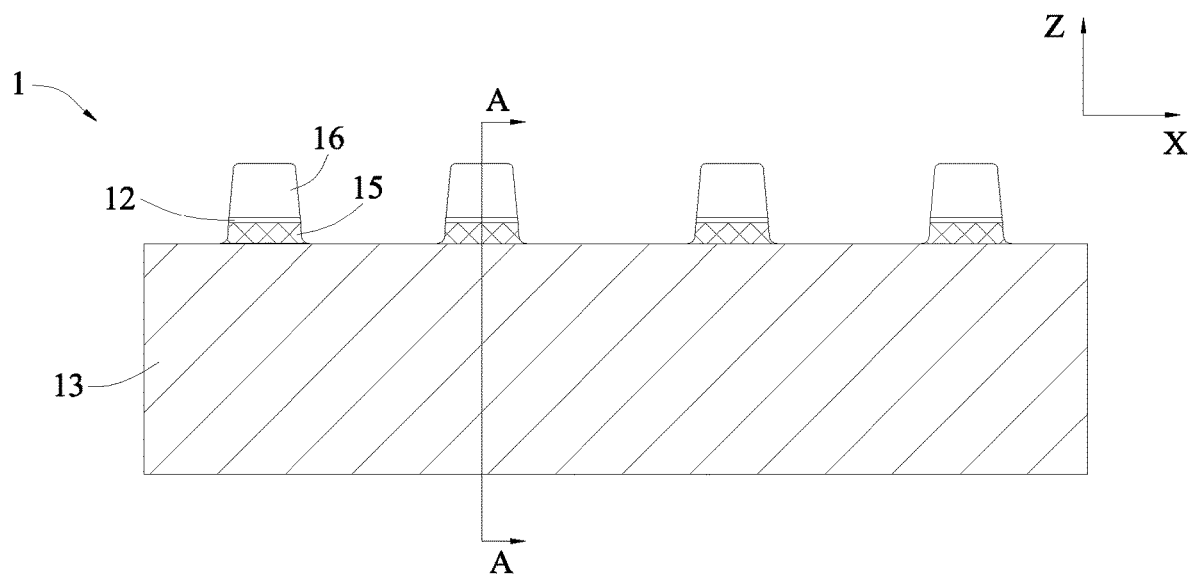
FIG. 7 is a schematic view of a first embodiment of the electrode member according to the present disclosure.
Figure 8:
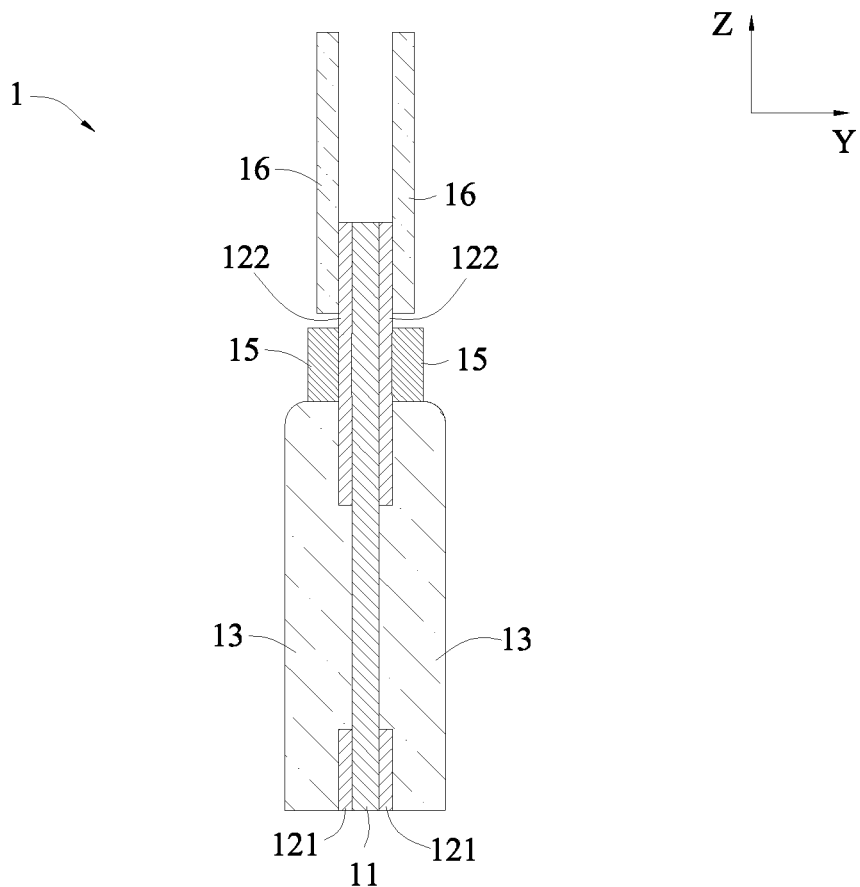
FIG. 8 is a cross sectional view taken along a line A-A of FIG. 7.

FIGS. 7-13 are schematic views of a first embodiment of an electrode member 1 of the present disclosure. Referring to FIG. 7 and FIG. 8, the electrode member 1 of the first embodiment comprises an insulating substrate 11, a first conducting layer 12 and an active material layer 13. The first conducting layer 12 is provided on each of two surfaces of the insulating substrate 11, the active material layer 13 is provided at a side of the first conducting layer 12 away from the insulating substrate 11.

The insulating substrate 11 can be made of PET (polyethylene terephthalate) film or PP (polypropylene) film.

A material of the first conducting layer 12 is one or more selected from a group consisting of metal conductive material and carbon-based conductive material; the metal conductive material is preferably one or more selected from a group consisting of aluminum, copper, nickel, titanium, silver, nickel copper alloy and aluminum zirconium alloy, the carbon-based conductive material is preferably one or more selected from a group consisting of graphite, acetylene carbon black, graphene and carbon nanotube.

The first conducting layer 12 can be provided on the surface of the insulating substrate 11 by at least one of the vapor deposition and the electroless plating. The vapor deposition is preferably a physical vapor deposition such as thermal evaporation deposition.

The active material layer 13 can be provided on a surface of the first conducting layer 12 by coating. It can use an active material (such as lithium manganese oxide and lithium iron phosphate), a binder, a conductive agent and a solvent to prepare a slurry, then the slurry is coated on the outer surfaces of the two first conducting layers 12, and the slurry is dried to form the active material layer 13.

Figure 9:
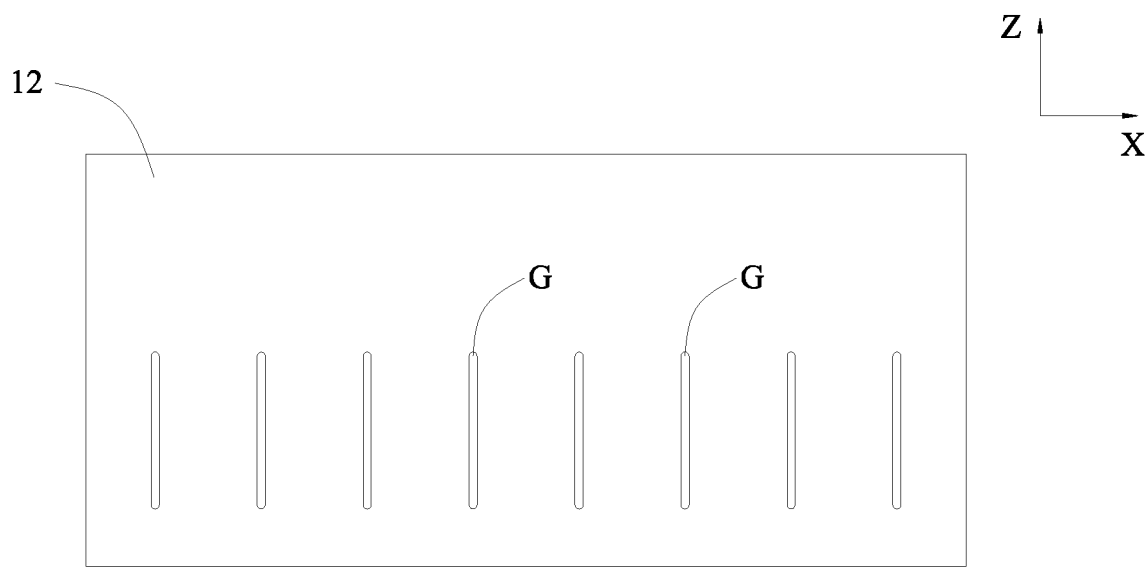
FIG. 9 is a schematic view of the electrode member of FIG. 7 in the forming process.

Referring to FIG. 9, the first conducting layer 12 is provided with a stripe-shape groove G, the stripe-shape groove G extends generally in a height direction Z and is used for releasing stress of the first conducting layer 12. A length of the stripe-shape groove G in a width direction X is 0.001 mm-1 mm, and is much less than a length of the stripe-shape groove G extending in the height direction Z. The stripe-shape groove G can be in the shape of straight line or curve line, as long as the stripe-shape groove G overall approximately extends in the height direction Z; in other words, a smaller angle can exist between an extending direction of the stripe-shape groove G and the height direction Z, for example, the angle can be less than 10 degrees.

A thickness of the insulating substrate 11 can be 1 µm-20 µm, a thickness of the first conducting layer 12 can be 0.1 µm-10 µm. Because the first conducting layer 12 is thin, in the process of cutting the electrode member 1, a burr generated in the first conducting layer 12 is small, and difficult to pierce the separator 4 more than ten micrometers, thereby avoiding short circuit and improving safety performance. In addition, when foreign matter pierces the electrode member 1 of the secondary battery, the thickness of the first conducting layer 12 is small, so the burr generated in a part of the first conducting layer 12 pierced by the foreign matter is small, and difficult to pierce the separator 4, thereby avoiding short circuit and improving safety performance.

The first conducting layer 12 comprises a main portion 121 and a protruding portion 122 extending from the main portion 121, the main portion 121 is coated with the active material layer 13; the protruding portion 122 is not coated with the active material layer 13. The active material layer 13 can be directly coated on a surface of the main portion 121, alternatively, other material also can be provided between the main portion 121 and the active material layer 13.

Figure 13:
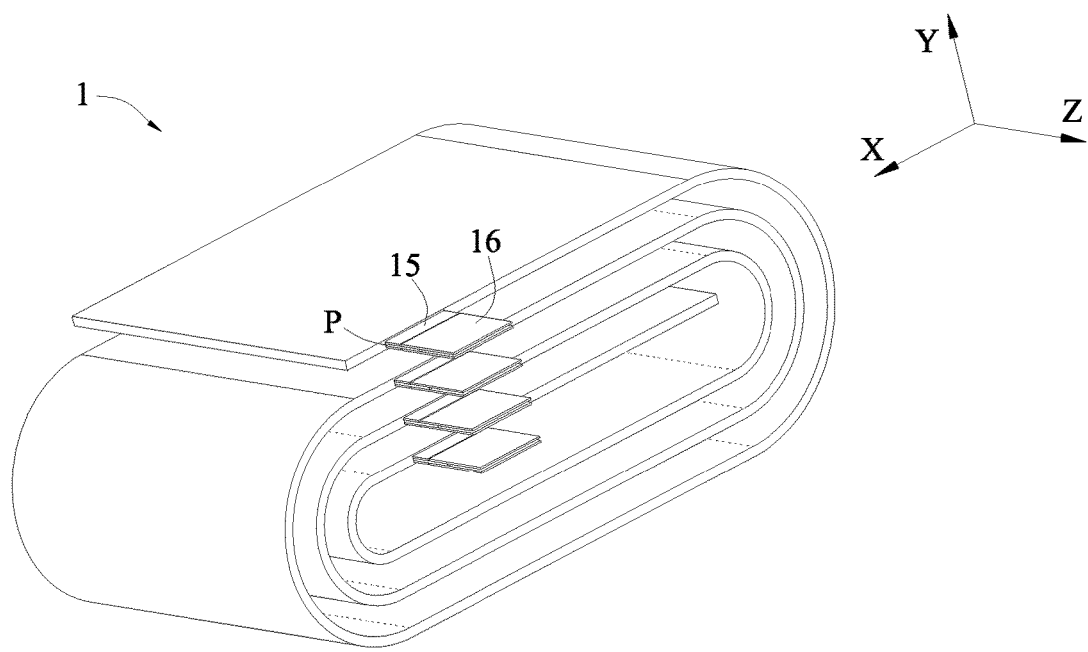
FIG. 13 is a schematic view of the electrode member of FIG. 7 after winding.

A part of the insulating substrate 11 corresponding to the protruding portion 122 and the protruding portion 122 form an electric guiding portion P. The electric guiding portion P can be provided as multiple in number and the electric guiding portions P are arranged to space apart from each other in the width direction X. Referring to FIG. 13, after winding, the electric guiding portions P of the electrode member 1 stack in a thickness direction Y.

The electrode member 1 further comprises a protecting layer 15, the protecting layer 15 is provided at a side of the protruding portion 122 away from the insulating substrate 11 and connected with the active material layer 13.

The protecting layer 15 comprises a binder and an insulating material. The insulating material comprises at least one of aluminum oxide and aluminum oxyhydroxide. The binder, the insulating material and a solvent are mixed to prepare a slurry, the slurry is coated on a surface of the protruding portion 122 and dried to form the protecting layer 15. A hardness of the protecting layer 15 is greater than a hardness of the protruding portion 122.

Figure 5:
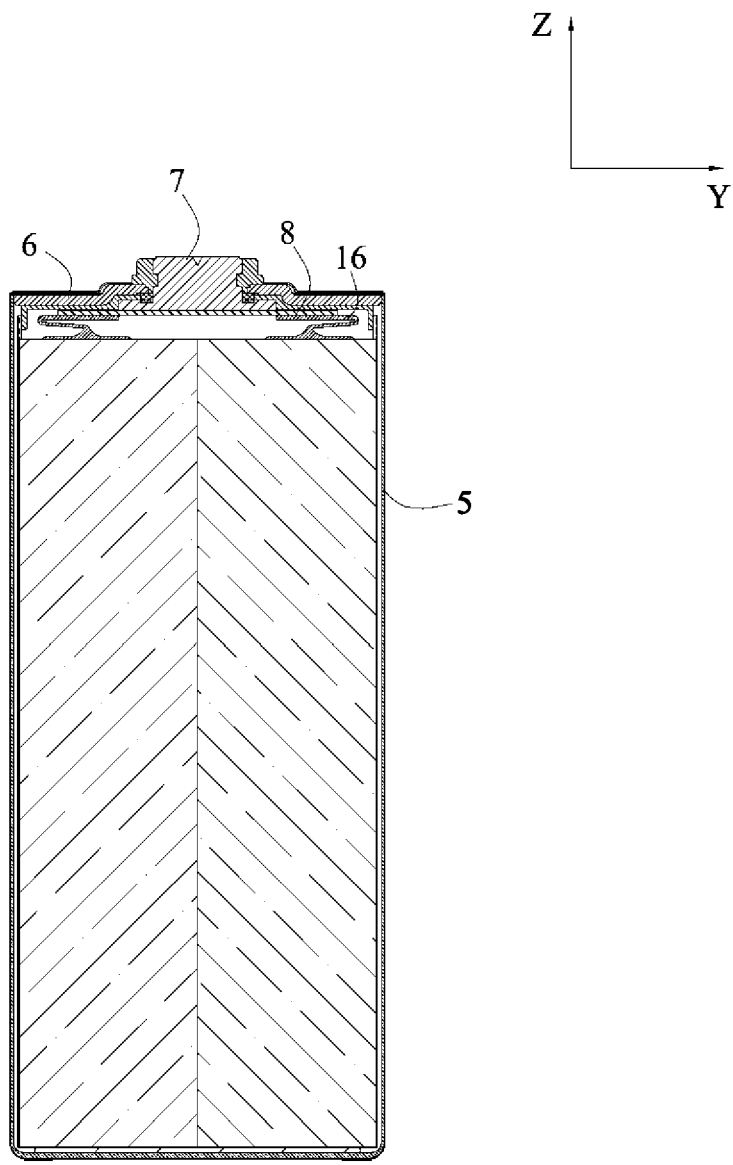
FIG. 5 is a schematic view of a secondary battery according to the present disclosure.

The electrode member 1 further comprises a conductive structure 16, the conductive structure 16 is welded with a region of the protruding portion 122 not covered by the protecting layer 15. Referring to FIG. 7 and FIG. 8, two sides of each electric guiding portion P in the thickness direction Y are fixed with the conductive structures 16. Referring to FIG. 13, after winding, all conductive structures 16 of the electrode member 1 stack and are welded with the connecting piece 8 together. Referring to FIG. 5, the electric current in the electrode member 1 can be transmitted to the outside via the connecting piece 8 and the electrode terminal 7.

The electrode member 1 of the first embodiment can be formed according to the following steps.

Step (i): forming a first conducting layer 12 on a surface of the insulating substrate 11 by vapor deposition or electroless plating, thereby preparing a composite strip; referring to FIG. 9, in the forming process, a stripe-shape groove G is reserved for the first conducting layer 12.

Figure 10:
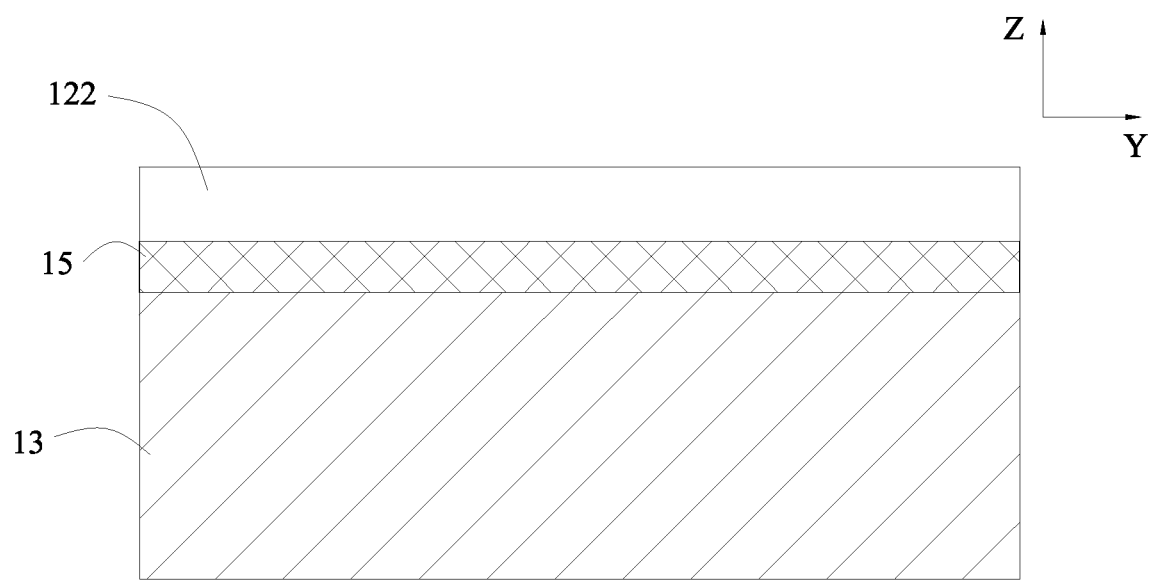
FIG. 10 is another schematic view of the electrode member of FIG. 7 in the forming process.

Step (ii): referring to FIG. 10, coating an active material layer 13 and a protecting layer 15 on a surface of the first conducting layer 12 at the same time.

Step (iii): rolling the active material layer 13 to thin the active material layer 13 and improve density.

Figure 12:
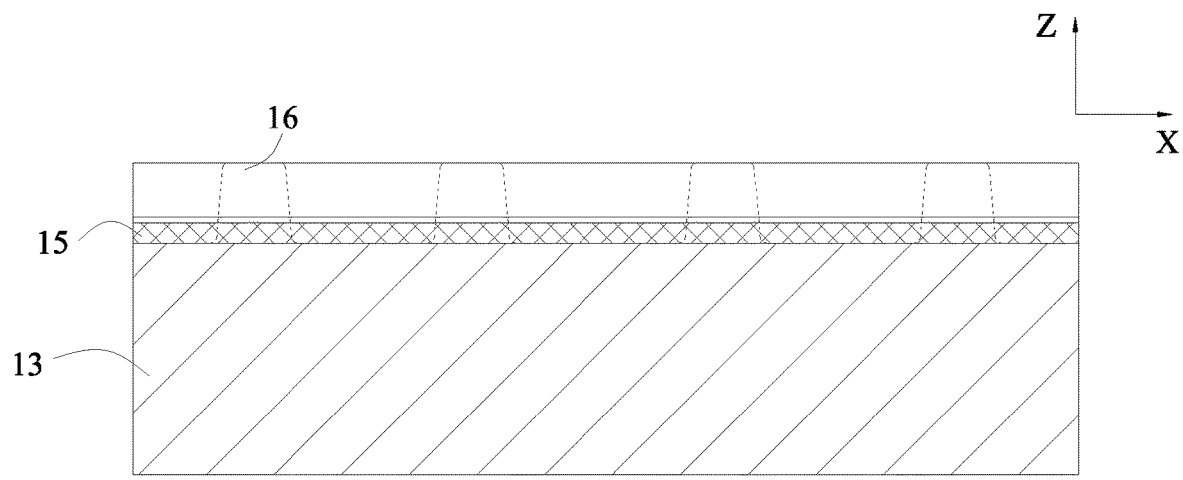
FIG. 12 is still another schematic view of the electrode member of FIG. 7 in the forming process.

Step (iv): referring to FIG. 12, after rolling, welding a metal foil (such as aluminum foil) to the first conducting layer 12, then cutting along dotted lines in FIG. 12 to form a plurality of electric guiding portions P and a plurality of conductive structures 16, thereby obtaining the electrode member 1 shown in FIG. 7.

In step (i), the first conducting layer 12 is formed on the surface of the insulating substrate 11 by vapor deposition or electroless plating, so the connecting force between the first conducting layer 12 and the insulating substrate 11 is small; under the effect of external force, the first conducting layer 12 may be prone to fall off from the surface of the insulating substrate 11.

Because an elastic modulus of the insulating substrate 11 is less than an elastic modulus of the first conducting layer 12, an extensibility of the insulating substrate 11 is greater than an extensibility of the first conducting layer 12. In step (iii), the insulating substrate 11 extends due to rolling; the extensibility of the insulating substrate 11 is greater, so the insulating substrate 11 will apply a force to the first conducting layer 12. In the prior art, the stress in the first conducting layer 12 cannot be released, so when the first conducting layer 12 extends to a certain extent, the stress in the first conducting layer 12 will be larger than the connecting force between the insulating substrate 11 and the first conducting layer 12, thereby resulting in the insulating substrate 11 and the first conducting layer 12 sliding relative to each other, and in turn leading to the first conducting layer 12 falling off from the surface of the insulating substrate 11, affecting performance of the electrode member 1.

In the present disclosure, the first conducting layer 12 is provided with the stripe-shape groove G, and the stripe-shape groove G can effectively release the stress in the first conducting layer 12, reduce stress concentration, avoid the stress in the first conducting layer 12 being excessive, effectively decrease the risk that the first conducting layer 12 falls off from the surface of the insulating substrate 11, and ensure performance of the electrode member 1.

Figure 11:
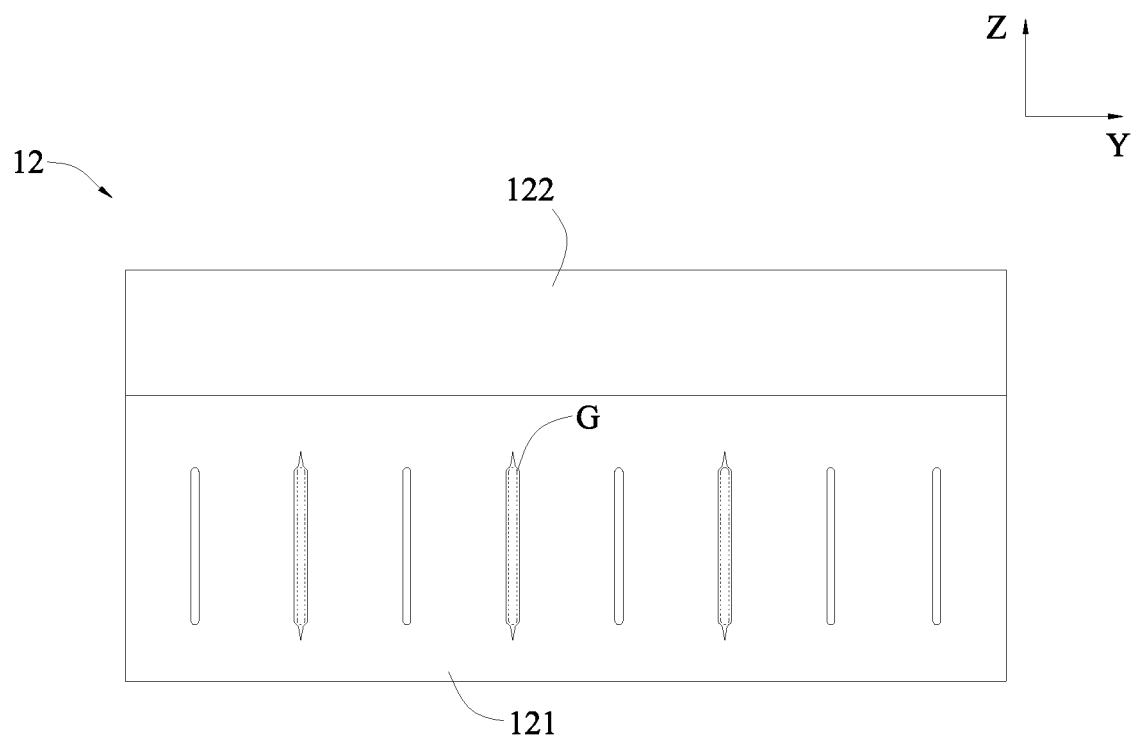
FIG. 11 is a schematic view of a first conducting layer of FIG. 10 after rolling.

Specifically, FIG. 11 shows a state of the first conducting layer 12 after rolling, the dotted lines shows a state of the stripe-shape groove G before rolling. In the rolling process of step (iii), the stress in the first conducting layer 12 gradually concentrates to the stripe-shape groove G; when the stress in the first conducting layer 12 is excessive, the first conducting layer 12 will be split along the stripe-shape groove G under the effect of the stress, thereby releasing the stress in time, avoiding the stress in the first conducting layer 12 being larger than the connecting force between the insulating substrate 11 and the first conducting layer 12, decreasing probability that the insulating substrate 11 and the first conducting layer 12 slide relative to each other, ensuring performance of the electrode member 1.

In the working process of the secondary battery, the electric current generated in the active material layer 13 flows to the protruding portion 122 via the main portion 121, in other words, in the first conducting layer 12, the electric current generally flows in the height direction Z; therefore, the overcurrent area of the first conducting layer 12 depends on the area of a cross section of the first conducting layer 12 perpendicular to the height direction Z. In the present disclosure, the stripe-shape groove G generally extends in the height direction Z, the length of the stripe-shape groove G in the width direction X is very small; in other words, a dimension of the stripe-shape groove G in the height direction Z is larger than a dimension of the stripe-shape groove G in the width direction X. Therefore, when the first conducting layer 12 splits along the stripe-shape groove G in the rolling process, the effect of the stripe-shape groove G on the overcurrent area of the first conducting layer 12 is little, thereby ensuring that the overcurrent capability of the first conducting layer 12 meets the requirement.

In step (iii), with the rolling process going on, the stress in the first conducting layer 12 will increase gradually; referring to FIG. 11, when rolling the electrode member 1 to a certain length in the width direction X, the stress in the first conducting layer 12 will bring the first conducting layer 12 to split along the stripe-shape groove G, thereby releasing the stress in time. Because the first conducting layer 12 has a larger length in the width direction X, the stripe-shape groove G is preferably provided as multiple in number, the stripe-shape grooves G in the width direction X are arranged to space apart from each other. The stripe-shape grooves G can release the stress gradually in the rolling process, thereby avoiding the stress in the first conducting layer 12 being larger than the connecting force between the insulating substrate 11 and the first conducting layer 12, decreasing the probability that the insulating substrate 11 and the first conducting layer 12 slide relative to each other, ensuring performance of the electrode member 1.

Referring to FIG. 8 and FIG. 9, the stripe-shape groove G passes through the first conducting layer 12 in the thickness direction Y; in other words, a depth of the stripe-shape groove G is equal to the thickness of the first conducting layer 12 in the thickness direction Y. At this time, the first conducting layer 12 is more prone to split along the stripe-shape groove G in the rolling process, thereby releasing the stress in time.

In step (ii), the active material layer 13 can be filled in the stripe-shape groove G, so the electric current in the active material layer 13 can flow to the first conducting layer 12 via the peripheral wall of the stripe-shape groove G, thereby improving current collecting capability of the first conducting layer 12. In step (iii), even if the first conducting layer 12 splits along the stripe-shape groove G, the active material layer 13 still can be filled in the split portion under the effect of the rolling force.

Because the elastic modulus of the insulating substrate 11 is small, in step (iii), the insulating substrate 11 corresponding to the main portion 121 will extend to a lower side of the protruding portion 122, which leads to the insulating substrate 11 inside the protruding portion 122 bulging, and the protruding portion 122 is prone to deform under the effect of the insulating substrate 11, thereby generating a crack. In the present disclosure, the protecting layer 15 has a greater strength, so it can provide supporting force for the protruding portion 122 in the process of rolling the electrode member 1, thereby limiting the deformation of the protruding portion 122, decreasing the probability of generating the crack in the protruding portion 122, improving overcurrent capability of the electrode member 1.

In the working process of the secondary battery, vibration and other factors may lead to the protruding portion 122 falling off; the protecting layer 15 is preferably connected with the active material layer 13, so the protecting layer 15 can be fixed with the active material layer 13, thereby increasing the connecting force of the protecting layer 15 in the electrode member 1, improving anti-vibration capability, avoiding the protecting layer 15 and the protruding portion 122 falling off together. At the same time, the protruding portion 122 is prone to bulge at the root portion (that is, a boundary between the protruding portion 122 and the main portion 121) of the protruding portion 122 close to the active material layer 13, so when the protecting layer 15 is connected with the active material layer 13, it can decrease the deformation of the protruding portion 122, reduce the probability of generating cracks, thereby improving the overcurrent capability of the electrode member 1.

Hereinafter other four embodiments of the present disclosure will be described. In order to make description concise, hereinafter the differences between the other four embodiments and the first embodiment are mainly described, the part which is not described can be understood with reference to the first embodiment.

Figure 14:
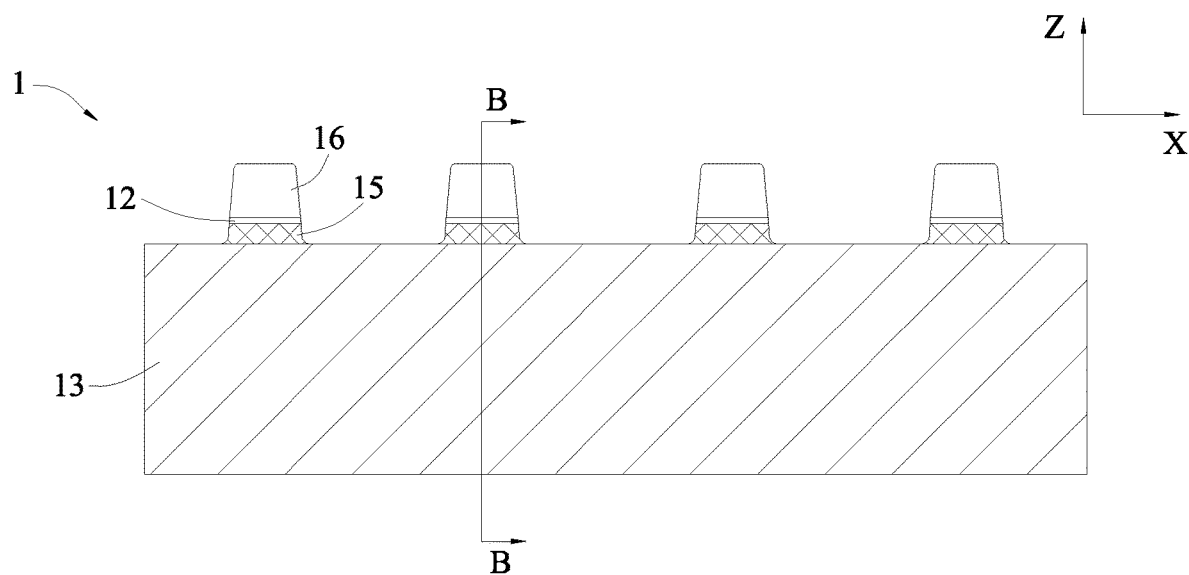
FIG. 14 is a schematic view of a second embodiment of the electrode member according to the present disclosure.
Figure 15:
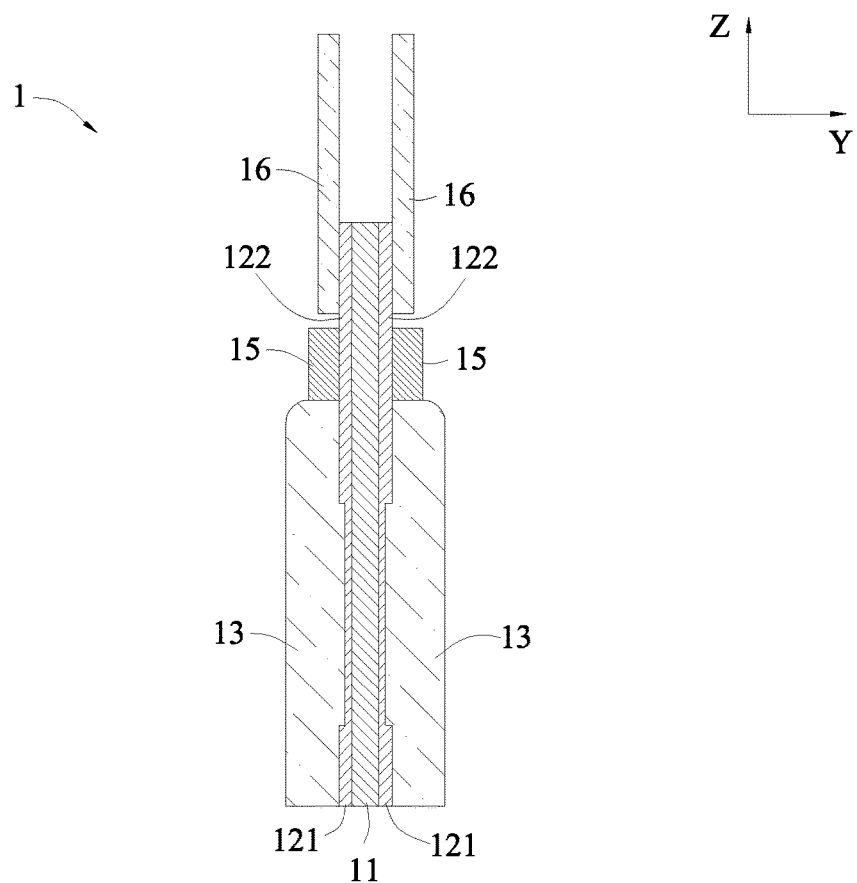
FIG. 15 is a cross sectional view taken along a line B-B of FIG. 14.
Figure 16:
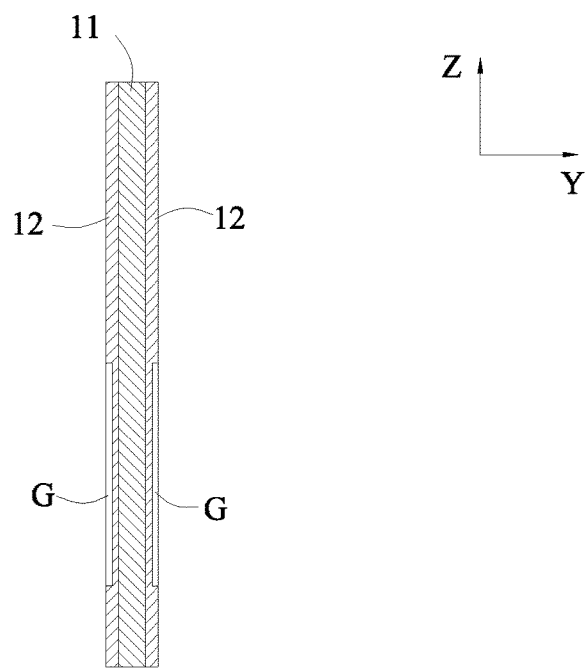
FIG. 16 is a schematic view of an insulating substrate and a first conducting layer of FIG. 15.

FIGS. 14-16 are schematic views of a second embodiment of the electrode member of the present disclosure. Referring to FIG. 14 and FIG. 16, in the thickness direction Y, the depth of the stripe-shape groove G is less than the thickness of the first conducting layer 12. Compared to the first embodiment, the first conducting layer 12 of the second embodiment has a larger overcurrent area. The stripe-shape groove G can have a U-shaped cross-section or a V-shaped cross-section.

Figure 17:
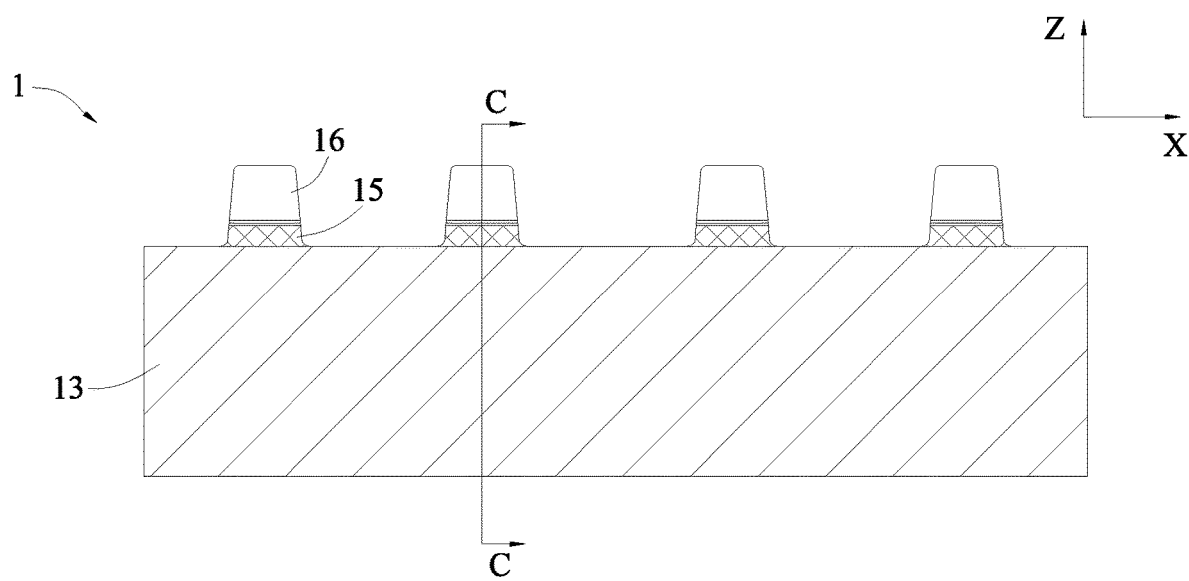
FIG. 17 is a schematic view of a third embodiment of the electrode member according to the present disclosure.
Figure 18:
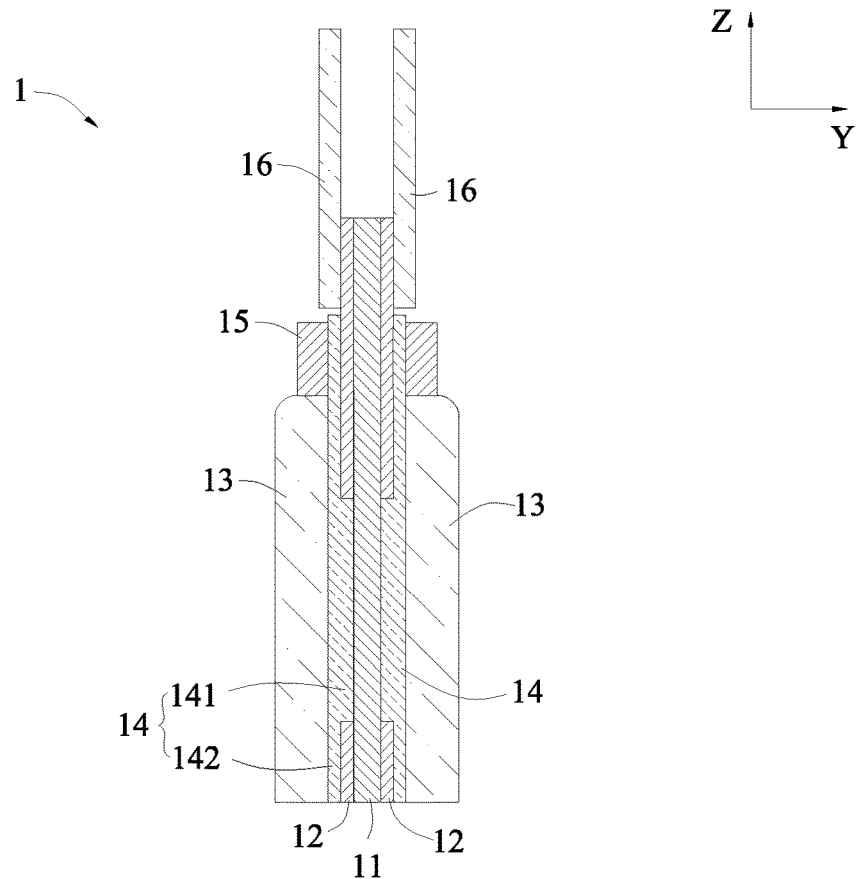
FIG. 18 is a cross sectional view taken along a line C-C of FIG. 17.

FIG. 17 and FIG. 18 are schematic views of a third embodiment of the electrode member of the present disclosure. Referring to FIG. 17 and FIG. 18, compared to the first embodiment, the electrode member 1 of the third embodiment further comprises a second conducting layer 14, the second conducting layer 14 has a first portion 141 provided in the stripe-shape groove G. The first portion 141 is filled in the stripe-shape groove G, the electric current around the stripe-shape groove G can be transmitted via the first portion 141; in other words, the first portion 141 can repair the conductive network of the first conducting layer 12, increase the overcurrent area and ensure whole overcurrent capability of the electrode member 1.

In the first embodiment, the active material layer 13 is filled in the stripe-shape groove G, so the distribution of the active material layer 13 is not uniform; in other words, the thickness of the active material layer 13 positioned in the stripe-shape groove G is larger than the thickness of the active material layer 13 in other position. In the working process of the secondary battery, the active material layer 13 may precipitate lithium in the position corresponding to the stripe-shape groove G. In the third embodiment, the first portion 141 is filled in the stripe-shape groove G, thereby ensuring flatness of the first conducting layer 12, improving the uniformity of distribution of the active material layer 13, and reducing risk of precipitating lithium.

The second conducting layer 14 further comprises a second portion 142, the second portion 142 is provided on a surface of the first conducting layer 12 away from the insulating substrate 11 and connected with the first portion 141, the active material layer 13 is provided on a surface of the second portion 142 away from the first conducting layer 12.

The second conducting layer 14 can be made of a metallic material or a non-metallic material. In order to decrease the burr generated when foreign matter pierces the electrode member 1, the second conducting layer 14 is preferably made from a non-metallic material which is not prone to generate the burr. Specifically, it can use a conductive carbon, a binder and a solvent to prepare a slurry, the slurry is coated on the first conducting layer 12, and the slurry is dried to form the second conducting layer 14. In the coating process, the slurry is filled in the stripe-shape groove G to form the first portion 141.

In step (ii), the slurry of the second conducting layer 14 is coated on the first conducting layer 12 firstly, and then the slurry of the active material layer 13 and the slurry of the protecting layer 15 are coated on the surface of the second conducting layer 14.

In step (iii), even if the first conducting layer 12 splits along the stripe-shape groove G, the second portion 142 can be filled in the split portion under the effect of rolling force, thereby repairing the conductive network of the first conducting layer 12, increasing overcurrent area and ensuring whole overcurrent capability of the electrode member 1.

If the second conducting layer 14 is only provided on the surface of the first conducting layer 12, the electric current in the second conducting layer 14 only can be transmitted to the first conducting layer 12 via the surface of the first conducting layer 12. In the present disclosure, the first portion 141 of the second conducting layer 14 is filled in the stripe-shape groove G of the first conducting layer 12, so the electric current not only can be transmitted to the first conducting layer 12 via the surface of the first conducting layer 12, but also can be transmitted via the peripheral wall of the stripe-shape groove G, thereby increasing a plurality of conduction paths, forming a multi-point conductive network, improving conductive performance of the electrode member 1, decreasing polarization of the electrode member 1 and polarization of the secondary battery, improving high rate charge-discharge performance of the secondary battery.

At least a part of the second portion 142 is provided on a surface of the protruding portion 122 away from the insulating substrate 11. The protecting layer 15 can be provided on the surface of the second portion 142 away from the protruding portion 122. The conductive structure 16 is welded with a region of the protruding portion 122 not covered by the second portion 142.

In step (iii), the main portion 121 extends under the bring of the insulating substrate 11, and the protruding portion 122 almost does not extend. The main portion 121 and the insulating substrate 11 apply a force to the protruding portion 122 when extending, because the protruding portion 122 is thin, the protruding portion 122 will generate a tiny crack under the effect of the force. In the present disclosure, the second portion 142 is provided on the surface of the protruding portion 122, so even if the protruding portion 122 generates a crack in the process of rolling, the electric current at the crack can be transmitted to the outside via the second portion 142, thereby repairing the conductive network and ensuring whole overcurrent capability of the electrode member 1.

A stiffness of the second conducting layer 14 is less than a stiffness of the first conducting layer 12. In other words, when the second conducting layer 14 is subjected to a force, the second conducting layer 14 deforms more easily. When the protruding portion 122 deforms, the second portion 142 will deform with the protruding portion 122; even if the protruding portion 122 fractures due to an excessive deformation, the second portion 142 will not be prone to be fractured, thereby ensuring transmission of the electric current.

The stripe-shape groove G passes through the first conducting layer 12 in the thickness direction Y, and the first portion 141 of the second conducting layer 14 is connected with the insulating substrate 11. The first portion 141 is filled in the stripe-shape groove G and bonded to the insulating substrate 11, thereby increasing the connecting strength among the first conducting layer 12, the second conducting layer 14 and the insulating substrate 11.

Figure 19:
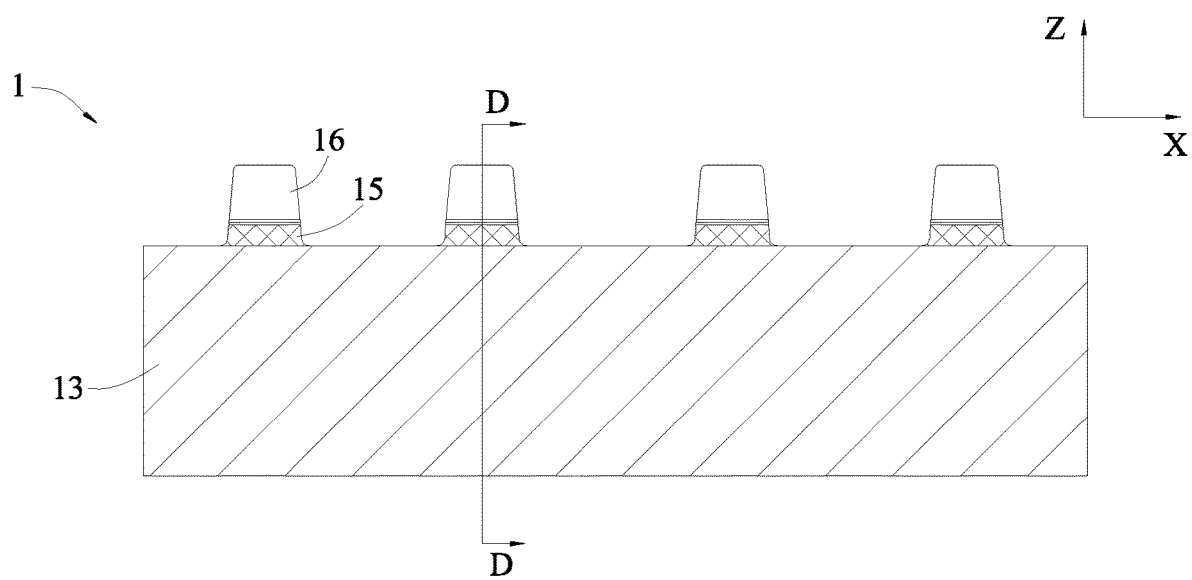
FIG. 19 is a schematic view of a fourth embodiment of the electrode member according to the present disclosure.
Figure 20:
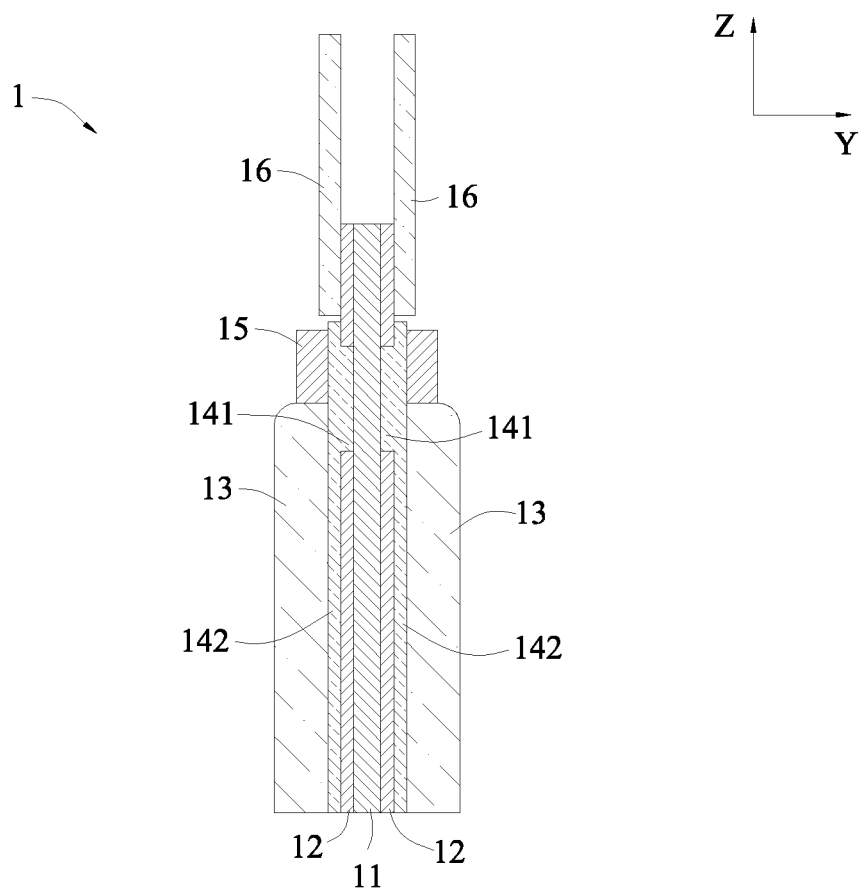
FIG. 20 is a cross sectional view taken along a line D-D of FIG. 19.
Figure 21:
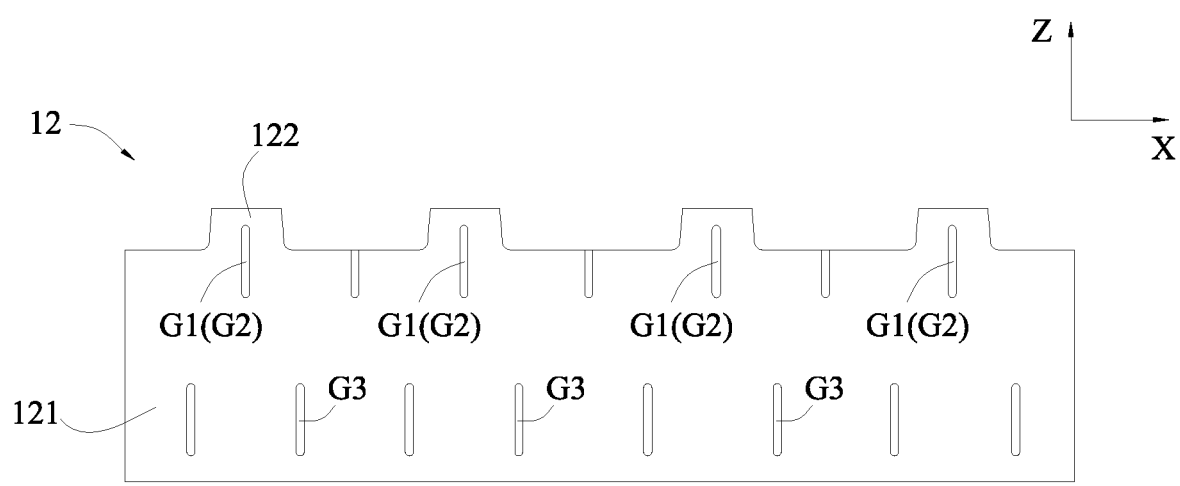
FIG. 21 is a schematic view of the first conducting layer of the electrode member of FIG. 19.

FIGS. 19-21 are schematic views of a fourth embodiment of the electrode member of the present disclosure. Referring to FIG. 19 to FIG. 21, compared to the third embodiment, the stripe-shape groove G of the fourth embodiment comprises a first groove G1 formed in the protruding portion 122.

In step (iii), a part of the insulating substrate 11 corresponding to the main portion 121 extends under the effect of rolling, the part of the insulating substrate 11 corresponding to the main portion 121 will apply a force to a part of the insulating substrate 11 corresponding to the protruding portion 122, thereby bringing the part of the insulating substrate 11 corresponding to the protruding portion 122 to extend. Because the protruding portion 122 is limited by the protecting layer 15, the protruding portion 122 almost does not extend; the part of the insulating substrate 11 corresponding to protruding portion 122 will apply an acting force to the protruding portion 122 when extending, if the acting force is larger than the connecting force between the insulating substrate 11 and the protruding portion 122, the protruding portion 122 will be prone to fall off from the insulating substrate 11. In the present disclosure, the first groove G1 can effectively release the acting force applied to the protruding portion 122, reduce stress concentration, avoid the acting force applied to the protruding portion 122 being excessive, effectively decrease the probability that the protruding portion 122 falls off, and ensure performance of the electrode member 1.

Preferably, in a direction away from the active material layer 13, the first groove G1 is not beyond the protecting layer 15. The acting force subjected by the protruding portion 122 is maximum at a region of the protruding portion 122 covered by the protecting layer 15, so the first groove G1 only needs to be provided in the region of the protruding portion 122 covered by the protecting layer 15. The acting force subjected by the protruding portion 122 is smaller at a region of the protruding portion 122 not covered by the protecting layer 15, so there is no risk of falling off; if the first groove G1 extends to the region of the protruding portion 122 not covered by the protecting layer 15, the overcurrent capability of the protruding portion 122 will be reduced instead.

The stripe-shape groove G further comprises a second groove G2 formed in the main portion 121, the first groove G1 is communicated with the second groove G2.

In step (iii), the main portion 121 extends under the force applied by the insulating substrate 11. Because the protruding portion 122 is limited by the protecting layer 15, the protruding portion 122 almost does not extend, a region of the main portion 121 close to the protruding portion 122 is subjected to a reaction force of the protruding portion 122. In other words, the region of the main portion 121 close to the protruding portion 122 is subjected to the force of the insulating substrate 11 and the reaction force of the protruding portion 122 at the same time, so the region of the main portion 121 close to the protruding portion 122 is more prone to fall off from the insulating substrate 11. However, in the present disclosure, the second groove G2 extends to the region of the main portion 121 close to the protruding portion 122, thereby effectively releasing the forces in the main portion 121, reduce stress concentration, effectively decrease the probability that the insulating substrate 11 and the main portion 121 slide relative to each other, ensure performance of the electrode member 1.

The stripe-shape groove G further comprises a plurality of third grooves G3, the third grooves G3 are arranged to space apart from each other in the width direction X, and the third grooves G3 are formed in main portion 121. In the width direction X, each third groove G3 is positioned between two adjacent second grooves G2; in the height direction Z, the third grooves G3 are alternated with the second grooves G2.

Figure 22:
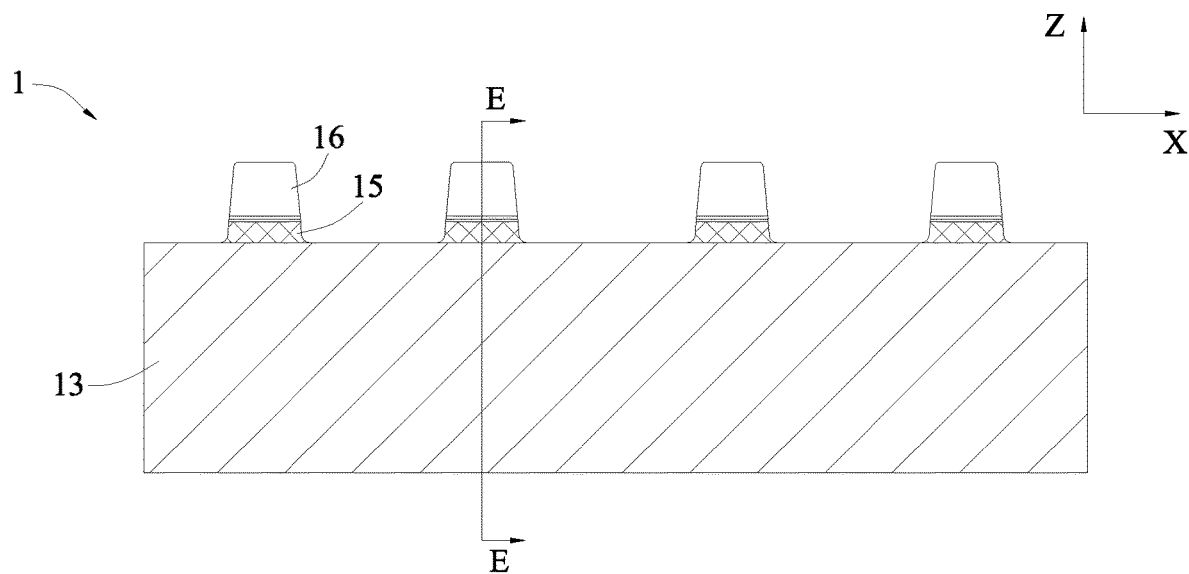
FIG. 22 is a schematic view of a fifth embodiment of the electrode member according to the present disclosure.
Figure 23:
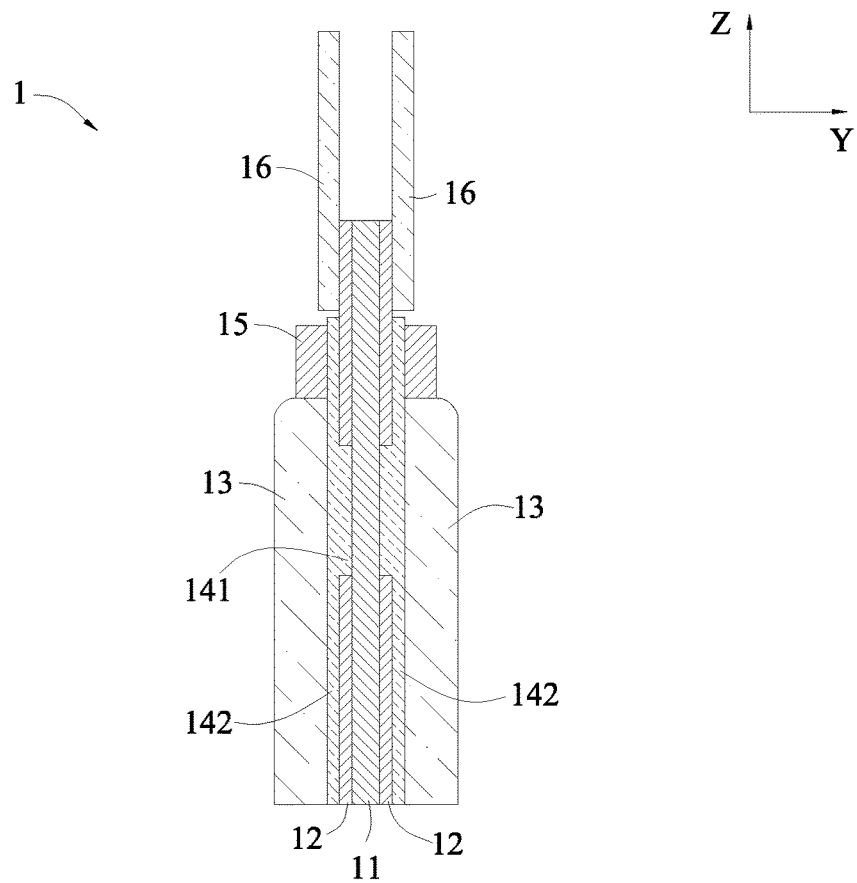
FIG. 23 is a cross sectional view taken along a line E-E of FIG. 22.
Figure 24:
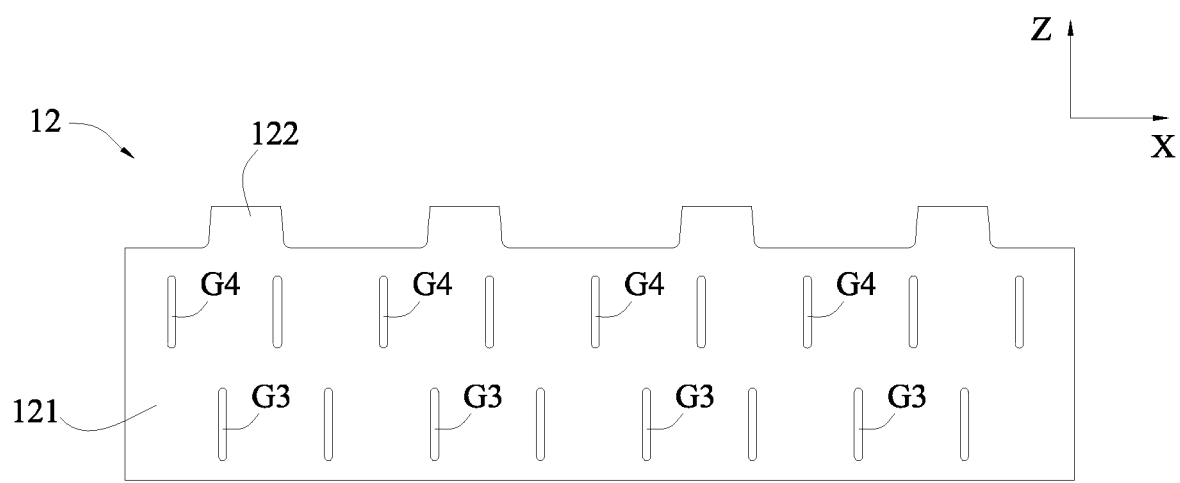
FIG. 24 is a schematic view of the first conducting layer of the electrode member of FIG. 22.

FIGS. 22-24 are schematic views of a fifth embodiment of the electrode member of the present disclosure. Referring to FIG. 22 to FIG. 24, the stripe-shape groove G of the fifth embodiment comprises a third groove G3 and a fourth groove G4, the third groove G3 and the fourth groove G4 are formed in the main portion 121. The third groove G3 is provided as multiple in number and the third grooves G3 are arranged to space apart from each other in the width direction X; the fourth groove G4 is provided as multiple in number and the fourth grooves G4 are arranged to space apart from each other in the width direction X.

In the width direction X, each third groove G3 is positioned between two adjacent fourth grooves G4. In the height direction Z, the third grooves G3 are alternated with the fourth grooves G4. The third grooves G3 and the fourth grooves G4 are arranged discretely in the width direction X and in the height direction Z, which can improve the releasing effect and uniformity of the stress.

What is claimed is:

1. An electrode member of a secondary battery, comprising an insulating substrate, a first conducting layer and an active material layer;
    the first conducting layer being provided on a surface of the insulating substrate, the active material layer being provided at a side of the first conducting layer away from the insulating substrate;
    the first conducting layer being provided with a stripe-shape groove extending in a height direction of the electrode member;
    the electrode member further comprises a second conducting layer, the second conducting layer has a first portion and a second portion;
    the first portion is provided in the stripe-shape groove;
    the second portion is provided on a surface of the first conducting layer away from the insulating substrate and connected with the first portion, the active material layer is provided on a surface of the second portion away from the first conducting layer,
    wherein
    the first conducting layer comprises a main portion and a protruding portion extending from the main portion, the main portion is coated with the active material layer, the protruding portion is not coated with the active material layer;
    the stripe-shape groove comprises a first groove provided in the protruding portion, and at least a part of the second portion is provided on a surface of the protruding portion away from the insulating substrate.

2. The electrode member according to claim 1, wherein the stripe-shape groove further comprises a second groove provided in the main portion, the first groove is communicated with the second groove.

3. The electrode member according to claim 1, wherein the electrode member further comprises a protecting layer, the protecting layer is provided on a region of the second portion corresponding to the protruding portion and connected with the active material layer.

4. The electrode member according to claim 1, wherein a stiffness of the second conducting layer is less than a stiffness of the first conducting layer.

5. The electrode member according to claim 1, wherein the stripe-shape groove passes through the first conducting layer in a thickness direction of the electrode member, and the first portion of the second conducting layer is connected with the insulating substrate.

6. The electrode member according to claim 1, wherein the stripe-shape groove is provided as multiple in number, and the stripe-shape grooves are arranged to space apart from each other in a width direction of the electrode member.

7. A secondary battery, comprising an electrode assembly; the electrode assembly comprising an electrode member, the electrode member comprising an insulating substrate, a first conducting layer and an active material layer;
    the first conducting layer being provided on a surface of the insulating substrate, the active material layer being provided at a side of the first conducting layer away from the insulating substrate;
    the first conducting layer being provided with a stripe-shape groove extending in a height direction of the electrode member;
    the electrode member further comprises a second conducting layer, the second conducting layer has a first portion and a second portion;
    the first portion is provided in the stripe-shape groove;
    the second portion is provided on a surface of the first conducting layer away from the insulating substrate and connected with the first portion, the active material layer is provided on a surface of the second portion away from the first conducting layer,
    wherein
    the first conducting layer comprises a main portion and a protruding portion extending from the main portion, the main portion is coated with the active material layer, the protruding portion is not coated with the active material layer;

the stripe-shape groove comprises a first groove provided in the protruding portion, and at least a part of the second portion is provided on a surface of the protruding portion away from the insulating substrate.

8. The secondary battery according to claim 7, wherein the stripe-shape groove further comprises a second groove provided in the main portion, the first groove is communicated with the second groove.

9. The secondary battery according to claim 7, wherein the electrode member further comprises a protecting layer, the protecting layer is provided on a region of the second portion corresponding to the protruding portion and connected with the active material layer.

10. The secondary battery according to claim 7, wherein a stiffness of the second conducting layer is less than a stiffness of the first conducting layer.

11. The secondary battery according to claim 7, wherein the stripe-shape groove passes through the first conducting layer in a thickness direction of the electrode member, and the first portion of the second conducting layer is connected with the insulating substrate.

12. The secondary battery according to claim 7, wherein the stripe-shape groove is provided as multiple in number, and the stripe-shape grooves are arranged to space apart from each other in a width direction of the electrode member.

13. The electrode member according to claim 3, wherein in a direction away from the active material layer, the first groove is not beyond the protecting layer.

14. The electrode member according to claim 1, wherein a thickness of the insulating substrate is 1 μm-20 μm, a thickness of the first conducting layer is 0.1 μm-10 μm.

15. The electrode member according to claim 1, wherein an elastic modulus of the insulating substrate is less than an elastic modulus of the first conducting layer.

16. The electrode member according to claim 1, wherein the electrode member further comprises a conductive structure, the conductive structure is welded with a region of the protruding portion not covered by the protecting layer.

* * * * *